United States Patent
Wang et al.

(10) Patent No.: US 10,755,082 B2
(45) Date of Patent: Aug. 25, 2020

(54) POINT TO SET SIMILARITY COMPARISON AND DEEP FEATURE LEARNING FOR VISUAL RECOGNITION

(71) Applicant: VMAXX, Inc., Menlo Park, CA (US)

(72) Inventors: Jinjun Wang, San Jose, CA (US); Sanpin Zhou, Xi'an (CN)

(73) Assignee: DEEP NORTH, INC., Foster City, CA (US)

( * ) Notice: Subject to any disclaimer, the term of this patent is extended or adjusted under 35 U.S.C. 154(b) by 106 days.

(21) Appl. No.: 15/792,408

(22) Filed: Oct. 24, 2017

(65) Prior Publication Data
US 2018/0114055 A1     Apr. 26, 2018

Related U.S. Application Data

(60) Provisional application No. 62/412,680, filed on Oct. 25, 2016, provisional application No. 62/412,675, filed on Oct. 25, 2016.

(51) Int. Cl.
| | |
|---|---|
| *G06K 9/00* | (2006.01) |
| *G06K 9/62* | (2006.01) |
| *G06K 9/46* | (2006.01) |

(52) U.S. Cl.
CPC ..... *G06K 9/00288* (2013.01); *G06K 9/00268* (2013.01); *G06K 9/00369* (2013.01); *G06K 9/4628* (2013.01); *G06K 9/6271* (2013.01); *G06K 9/6288* (2013.01); *G06K 9/4609* (2013.01); *G06K 9/6218* (2013.01)

(58) Field of Classification Search
None
See application file for complete search history.

(56) References Cited

U.S. PATENT DOCUMENTS

| | | |
|---|---|---|
| 2012/0046857 A1 | 2/2012 | Mori |
| 2016/0035078 A1 | 2/2016 | Lin et al. |
| 2016/0063359 A1 | 3/2016 | Szegedy et al. |
| 2016/0104056 A1 | 4/2016 | He et al. |
| 2017/0300785 A1* | 10/2017 | Merhav ............... G06K 9/6257 |

FOREIGN PATENT DOCUMENTS

| | | |
|---|---|---|
| WO | 2015/192263 | 12/2015 |
| WO | 2016/141282 | 9/2016 |

OTHER PUBLICATIONS

Zhang et al. "Tracking person of interest via adaptive discriminative features" Sep. 16, 2016.

* cited by examiner

*Primary Examiner* — Atiba O Fitzpatrick
(74) *Attorney, Agent, or Firm* — David R. Stevens; Stevens Law Group

(57) ABSTRACT

A visual recognition system to process images includes a global sub-network including a convolutional layer and a first max pooling layer. A local sub-network is connected to receive data from the global sub-network, and includes at least two convolutional layers, each connected to a max pooling layer. A fusion network is connected to receive data from the local sub-network, and includes a plurality of fully connected layers that respectively determine local feature maps derived from images. A loss layer is connected to receive data from the fusion network, set filter parameters, and minimize ranking error.

20 Claims, 6 Drawing Sheets

POINT TO SET SIMILARITY COMPARISON AND DEEP FEATURE LEARNING FOR VISUAL RECOGNITION

RELATED APPLICATIONS

This application claims the benefit of U.S. Provisional Application Ser. No. 62/412,675, filed Oct. 25, 2016, which is hereby incorporated herein by reference in its entirety for all purposes. This application also claims the benefit of U.S. Provisional Application Ser. No. 62/412,680, filed Oct. 25, 2016, which is hereby incorporated herein by reference in its entirety for all purposes.

TECHNICAL FIELD

The present disclosure relates generally to a deep learning system capable of accurately classifying facial features derived from video surveillance systems.

BACKGROUND

Visual recognition is a challenging but important problem in the video surveillance system, due to large appearance variations caused by light conditions, view angles, body poses and mutual occlusions. Visual targets captured by surveillance cameras are usually in small size, making many visual details such as facial components are indistinguishable, with different targets looking very similar in appearance. This makes it difficult to recognize a reference image to a target from a variety of candidates in the gallery set based on the existing feature representations.

Various image identification systems have been used to address this problem. Typically, an identification system takes one or more reference images and compares them to a target image, with a generated similarity score helping to classify the target as the same or different person. This generally requires both procedures for extracting features from an image, and procedures for defining a similarity metric. Feature types are ideally invariant under various lighting conditions and camera position, and can include color histogram data, Haar features, Gabor features, or the like. Similarity scoring can be based on saliency weighted distance, Local Fisher discriminant analysis, Mahalanobois metric learning, locally adaptive decision functions, or the like.

More recently, the deep learning methods have been used. Both the feature extraction and the similarity scoring can use a deep neural network. For example, a convolutional neural network (CNN) can be used to extract features from images, and a second CNN used to compare the features with the similarity metric. For example, a first CNN can use patch matching for feature extraction, while a second CNN can use similarity metrics including cosine similarity and Binomial deviance, Euclidean distance and triplet loss, or logistic loss to directly form a binary classification problem of whether the input image pair belongs to the same identity.

One discussed system uses cross-input neighborhood differences and patch summary features that evaluate image pair similarity at an early CNN stage to make use of spatial correspondence in feature maps. This system, described by Ahmed, E., Jones, M., Marks, T. K. in a paper title "An improved deep learning architecture for person re-identification" in: Computer Vision and Pattern Recognition (CVPR), 2015 IEEE Conference on. IEEE (2015), uses two layers of convolution and max pooling to learn a set of features for comparing the two input images. A layer that computes cross-input neighborhood difference features is used to compare features from one input image with the features computed in neighboring locations of the other image. This is followed by a subsequent layer that distills these local differences into a smaller patch summary feature. Next, another convolutional layer with max pooling is used, followed by two fully connected layers with softmax output.

SUMMARY

A visual recognition system to process images can include a global sub-network including a convolutional layer and a first max pooling layer; a local sub-network connected to receive data from the global sub-network (which can contain rectified linear units (ReLU)), and including at least two convolutional layers, each connected to a max pooling layer. In selected embodiments, at least two convolutional layers of the local sub-network include a plurality of filters. A fusion network is connected to receive data from the local sub-network, and can include a plurality of fully connected layers that respectively determine local feature maps derived from images. The fusion layer can also include rectified linear units connected between fully connected layers. Finally, a loss layer is connected to receive data from the fusion network, set filter parameters, and minimize ranking error. In certain embodiments, the loss layer implements a symmetric triplet loss function that can simultaneously maximize the inter-class distances and minimize the intra-class distances by fine tuning the directions of gradient back-propagation. More specifically, the loss layer can implement a symmetric triplet loss function where $$X_i^{(m)} = \Psi(W^{(m)} * X_i^{(m-1)} + b^{(m)}), i=1, 2, \ldots, N; m=1, 2, \ldots, M; X_i^{(0)} = X_i.$$

In some embodiments, the dimension of the fully connected layers in the fusion layer is at least 100, while the dimension of the fully concatenated connected layers representing image featured in the fusion layer is at least 800.

In another embodiment, an image processing method for visual recognition can include the steps of providing a global sub-network including a convolutional layer and a first max pooling layer to extract features from images and form feature maps;

passing the feature maps to a local sub-network connected to the global sub-network to discriminately learn features; generating final feature representations using a fusion network connected to receive data from the local sub-network; and setting filter parameters and minimizing ranking errors using a loss layer connected to receive data from the fusion network.

In another embodiment, a point to set similarity metric method for visual recognition can include the steps of providing an anchor sample and a set of positive and negative training samples; defining a similarity metric including a pairwise term and a triplet term; randomly selecting positive and negative training samples for the pairwise term; and choosing marginal samples for the triplet term to maximize relative distance between the anchor sample to the positive set and anchor sample to the negative set. Weight terms for the similarity metric can be adaptively updated, and gradient back propagation can be used to optimize parameters for the similarity metric. In some embodiments, the similarity metric includes a pairwise term and a triplet term as follows:

$$L = L_P(X, W, b) + \alpha L_P(X, W, b)$$

where $L_P(\bullet)$ is the pairwise term, $L_T(\bullet)$ denotes the triplet term, and $\alpha$ is a constant weight parameter.

Another embodiment of a a self-paced method for visual recognition includes the steps of providing a set of positive and negative training samples including easy and hard samples; defining a similarity metric including a weighted triplet term; and adaptively updating weights of the triplet term using a self-paced regularizer term that accounts for loss and model age. The self-paced regularizer term can be a polynomial term acting to increase contribution of easy samples relative to hard samples when model age is young. In some embodiments, the self-paced regularizer term is:

$$\mathcal{G} = \lambda \left( \frac{1}{t} \|\mu\|_2^t - \frac{1}{t} \sum_{i=1}^{N} u_i \right)$$

where $\lambda > 0$ is a model age, $1 > \vartheta > 0$ is a mature age, and t is a polynomial order.

In addition, a symmetry regularizer term can be used to revise asymmetric gradient back-propagation used by the similarity metric. Use of gradient back-propagation methods to optimize convolutional neural networks parameters and weights of training samples is used in various embodiments. Additional steps can include randomly selecting positive and negative training samples for the pairwise term; and choosing marginal samples for the triplet term to maximize relative distance between the anchor sample to the positive set and anchor sample to the negative set.

DETAILED DESCRIPTION

Figure 1:
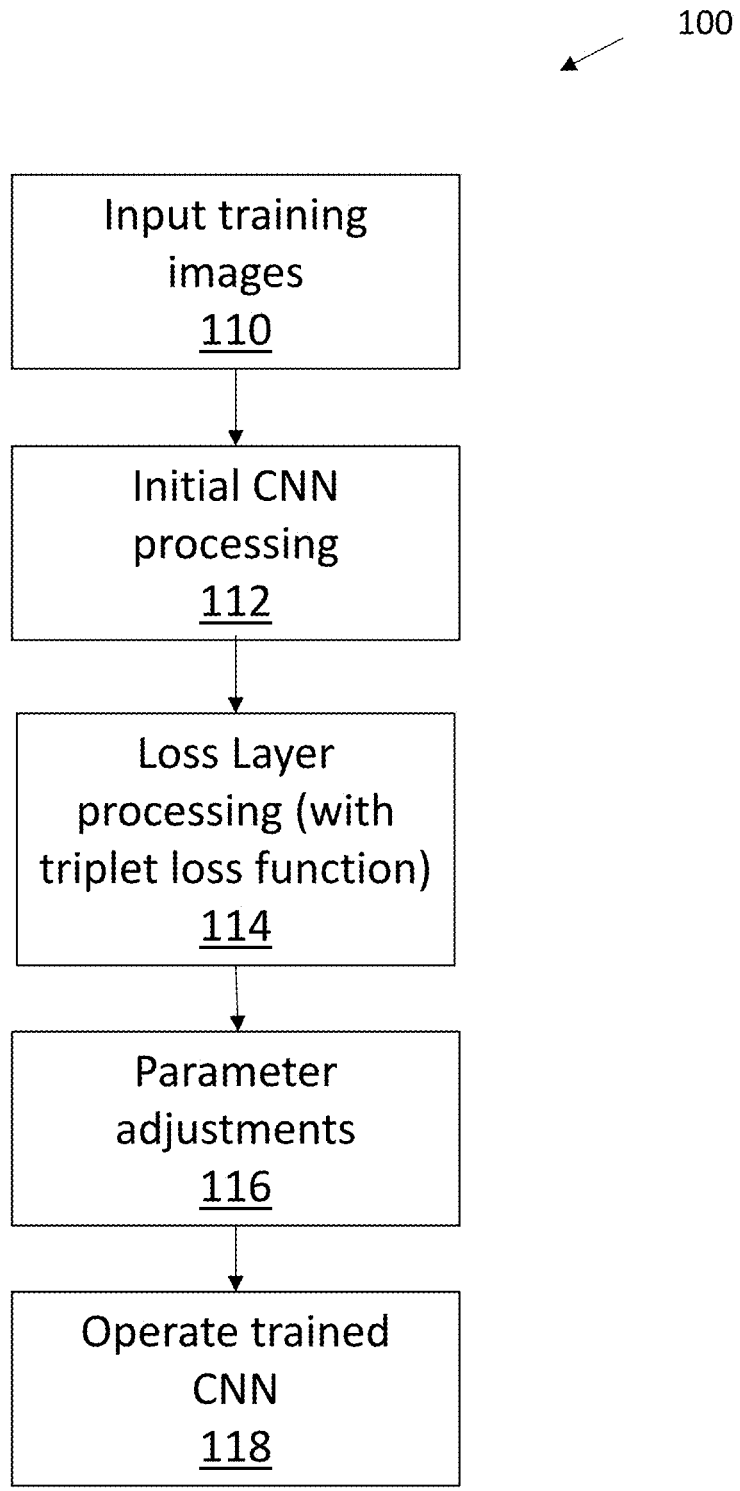
FIG. 1 is a method for operating a neural network for improved visual recognition.

FIG. 1 is a method for operating a convolutional neural network (CNN) system 100. In step 110, training images are input. In step 112, initial CNN processing occurs, with data being transferred in step 114 to a loss layer that provides for use of a symmetric triplet loss function (to be described in more detail later herein). Parameter adjustments are made to improve CNN efficacy in step 116, and when the CNN is operationally useful, video images can be analyzed in step 118.

The CNN can be based on a wide variety of architectures and modules, but can include input processing modules, convolutional layers with a variety of possible learnable filters (kernels), spatial arrangements, parameter sharing schemes. Pooling layers with various non-linear down sampling mechanisms, ReLU layers to increase non-linear properties of decision functions, and one or more fully or partially connected layers can be used in various embodiments.

Figure 2:
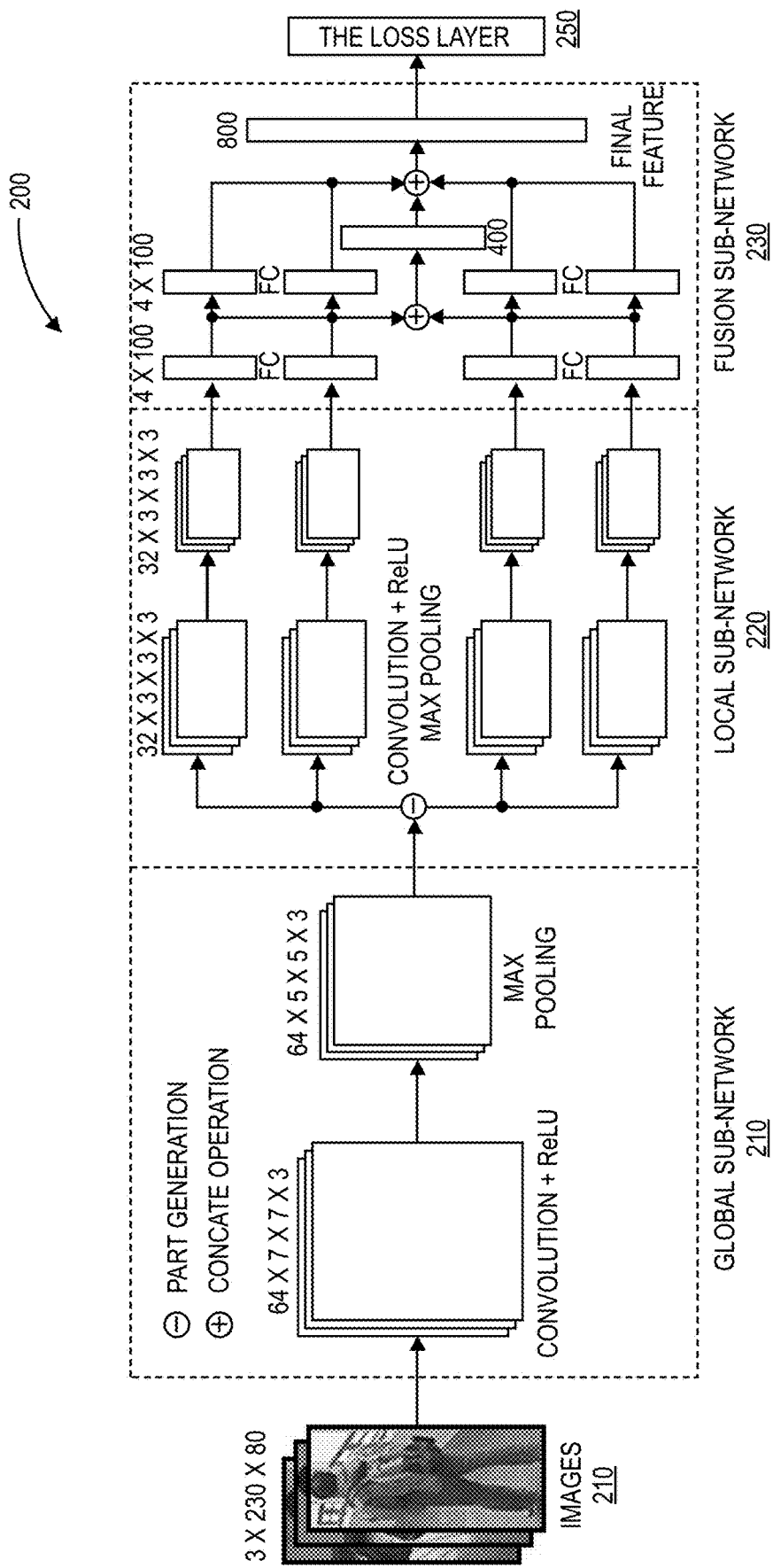
FIG. 2 illustrates a system with global, local, and fusion subnetworks for improved visual recognition.

FIG. 2 is an illustration of a deep learning neural network architecture designed to extract discriminative and robust feature representations from different targets. As seen in FIG. 2, the deep learning system 200 includes a global sub-network 210, a local sub-network 220, and fusion sub-network 230. Input is images 240, and output is to a loss layer 250

The first part of system 200 is the global sub-network 210, which includes a convolutional layer and max pooling layer. These layers are used to extract the low-level features of the input images, providing multi-level feature representations to be discriminately learned in the following part sub-network. The input images 210 are of pixel size of 230× 80×3, and are firstly passed through 64 learned filters of size 7×7×3. Then, the resulting feature maps are passed through a max pooling kernel of size 3×3×3 with stride 3. Finally, these feature maps are passed through a rectified linear unit (ReLU) to introduce non-linearities.

The second part of system 200 is the local sub-network 220, which includes four teams of convolutional layers and max pooling layers. The input feature maps are divided into four equal horizontal patches across the height channel, which introduces 4×64 local feature maps of different body parts. Then, each local feature map is passed through a convolutional layer, which has 32 learned filters, each of size 3×3. Afterwards, the resulting feature maps are passed through max pooling kernels of size 3×3 with stride 1. Finally, a rectified linear unit (ReLU) is provided after each max pooling layer. In order to learn the feature representations of different body parts discriminately, parameters are not shared among the four teams of convolutional neural layers.

The third part of system 200 is a fusion sub-network 230, which includes four teams of fully connected layers. Firstly, the local feature maps of different body parts are discriminately learned by following two fully-connected layers in each team. The dimension of the fully-connected layer is 100, and a rectified linear unit (ReLU) is added between the two fully connected layers. Then, the discriminately learned local feature representations of the first four fully connected layers are concatenated to be summarized by adding another fully connected layer, whose dimension is 400. Finally, the resulting feature representation is further concatenated with the outputs of the second four fully connected layers to generate an 800-dimensional final feature representation. Again, parameters among the four fully connected layers are not shared to keep the discriminative of feature representations of different body parts.

Training this system 200 can utilize learning loss functions such as magnet loss, contrastive loss (with pairwise examples), or triplet loss functions that take an anchor example and try to bring positive examples closer while also pushing away negative example. A conventional triplet loss function is $$\arg\min_{W,b} L = \Sigma_{i=1}^{N} \max\{M + \|f(X_i^a) - f(X_i^p)\|_2^2 - \alpha \|f(X_i^a) - f(X_i^n)\|_2^2, 0\}.$$

Another triplet loss function is known as symmetric triplet loss function, where $\{X_i\}_{i=1}^{N}$ is the set of input training data, where $X_i$ denotes the $i^{th}$ raw input data, and N is the number of training samples. The goal of the symmetric triplet loss is to train the system 200 to learn filter weights and biases that minimize the ranking error from the output layer. A recursive function for an M-layer deep model can be defined as follows:

$$X_i^{(m)} = \Psi(W^{(m)} * X_i^{(m-1)} + b^{(m)}), \quad i=1, 2, \ldots, N; m=1, 2, \ldots, M; X_i^{(0)} = X_i.$$

where $W^{(m)}$ denotes the filter weights of the $m^{th}$ layer to be learned, and $b^{(m)}$ refers to the corresponding biases, * denotes the convolution operation, $\Psi(\bullet)$ is an element-wise non-linear activation function such as ReLU, and $X_i^{(m)}$ represents the feature maps generated at layer m for sample $X_i$. For simplicity, parameters in the network can be considered as whole and defined as $W=\{W^{(1)}, \ldots, W^{(M)}\}$ and $\{b^{(1)}, \ldots, b^{(M)}\}$.

Given a set of triplet training samples $\{X_i^a, X_i^p, X_i^n\}_{i=1}^N$, the symmetric triplet loss improves the ranking accuracy by jointly keeping the similarity of positive pairs and dissimilarity of negative pairs. The hinge-like form of symmetric triplet loss can be formulated as follows:

$$\arg\min_{W,b} L = \sum_{i=1}^N \max\{M + \|f(X_i^a) - f(X_i^p)\|_2^2 - \alpha\|f(X_i^a) - f(X_i^n)\|_2^2 - \beta\|f(X_i^p) - f(X_i^n)\|_2^2, 0\}$$

where $f(\bullet)$ denotes the feature map between the input and the output, M is a margin parameter, and $\alpha$, $\beta$ are two adaptive weight parameters.

Figure 3:
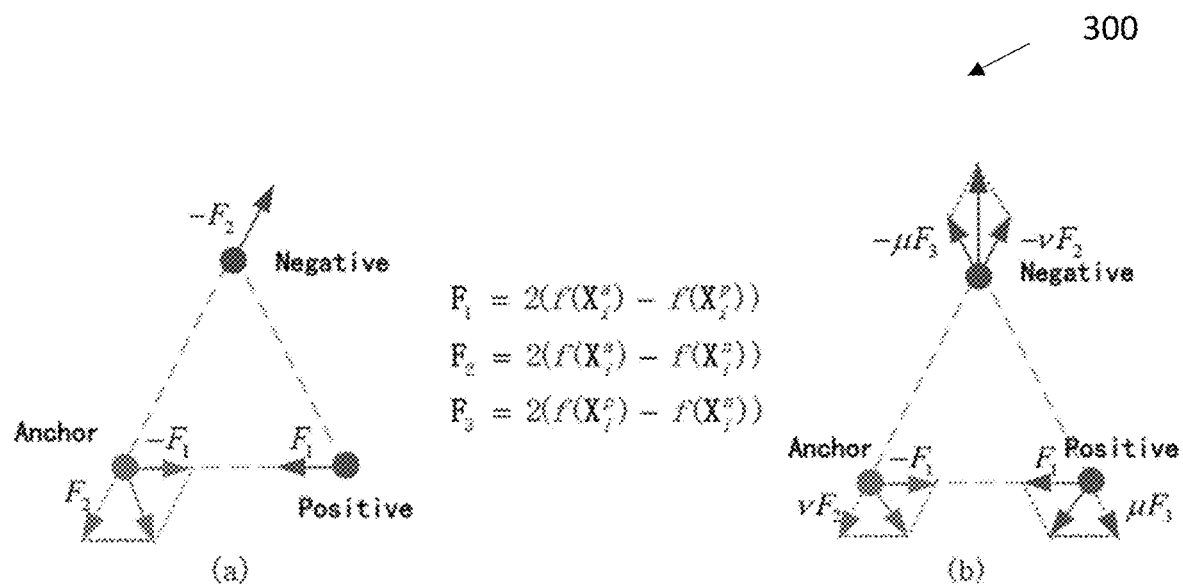
FIG. 3 illustrates both triple and symmetric triplet functions.
Figure 4:
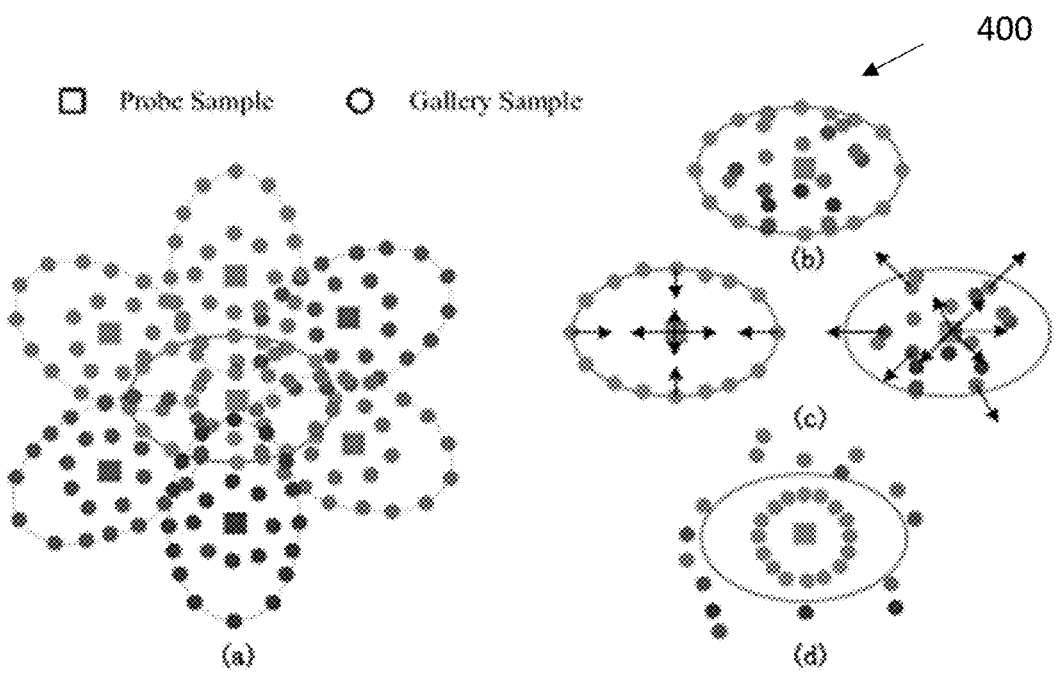
FIG. 4 illustrates an original distribution of training samples processed to form a final, widely separated distribution.

FIG. 3 is a cartoon 300 comparing symmetric triplet loss with the conventional triplet loss from the perspective of gradient back-propagation in a triplet unit, where $F_1$, $F_2$ and $F_3$ denote three basic directions. As compared to triplet loss function, a symmetric triple loss function maximizes the relative distance by jointly minimizing the intra-class distances and maximizing the inter-class distances. The main difference of the two methods can be analyzed from the perspective of gradient back-propagation. Use of this described method can simultaneously maximize the inter-class distances and minimize the intra-class distances by fine tuning the directions of gradient back-propagation, while the conventional triplet loss back-propagates the gradients in a fixed pattern which may lead to the intra-class distance become larger in the training process. This is also seen with respect to FIG. 4, which is a cartoon 400 illustrating the triplet term wherein (a) shows the original distribution of training samples; (b) exhibits the chosen marginal samples; (c) optimizes the system 200 in the symmetric triplet formulation; and (d) shows the final, widely separated distribution of training samples.

In some embodiments a momentum method can be used to update the adaptive weights, and the gradient back-propagation method to optimize the parameters of the system 200. These can be carried out in the mini-batch pattern. For simplicity, consider the parameters in the network as a whole and define $$\Omega^{(m)} = [W^{(m)}, b^{(m)}], \text{ and } \Omega = \{\Omega^{(1)}, \ldots, \Omega^{(M)}\}.$$

The weight parameters $\alpha$, $\beta$ can be adaptively learned in the training process by using the momentum method. In order to simplify the problem, define $\alpha = \xi + \vartheta$ and $\beta = \xi - \vartheta$, therefore they can be updated by only updating $\vartheta$. The partial derivative of the symmetric loss with respect to $\vartheta$ can be formulated as follows:

$$t = \begin{cases} \dfrac{\partial T(X_i^a, X_i^p, X_i^n)}{\partial \vartheta}, & \text{if } T > M; \\ 0, & \text{else.} \end{cases}$$

where $T = \alpha\|f(X_i^a) - f(X_i^n)\|_2^2 + \beta\|f(X_i^p) - f(X_i^n)\|_2^2 - \|f(X_i^a) - f(X_i^p)\|_2^2$, and $$\frac{\partial T}{\partial \vartheta}$$

can be formulated as follows:

$$\frac{\partial T}{\partial \vartheta} = \|f(X_i^a) - f(X_i^n)\|_2^2 - \|f(X_i^p) - f(X_i^n)\|_2^2$$

Then $\vartheta$ can be updated as follows:

$$\vartheta = \vartheta - \eta \cdot t$$

where $\eta$ is the updating rate. It can be clearly seen that when $$\|f(X_i^a) - f(X_i^n)\|_2^2 < \|f(X_i^p) - f(X_i^n)\|_2^2,$$

namely $t < 0$, then $\alpha$ will be decreased while $\beta$ will be increased; and vice versa. As a result, the strength of back-propagation to each sample in the same triplet will be adaptively tuned, in which the anchor sample and positive sample will be clustered, and the negative sample will be far away from the hyper-line expanded by the anchor sample and the positive sample.

In order to employ the back-propagation algorithm to optimize the network parameters, the partial derivative of the symmetric triplet loss is computed as follows:

$$\frac{\partial L}{\partial \Omega} = \sum_{i=1}^N \mathcal{T}(X_i^a, X_i^p, X_i^n)$$

According to the definition of $T(X_i^a, X_i^p, X_i^n)$, the gradient can be obtained as follows:

$$\mathcal{T} = \begin{cases} \dfrac{\partial T(X_i^a, X_i^p, X_i^n)}{\partial \Omega}, & \text{if } T > M; \\ 0, & \text{else.} \end{cases}$$

where $$\frac{\partial T}{\partial \Omega}$$

is formulated as follows:

$$\frac{\partial T}{\partial \Omega} = 2(f(X_i^a) - f(X_i^p))\frac{\partial f(X_i^a) - \partial f(X_i^p)}{\partial \Omega} - 2\alpha(f(X_i^a) - f(X_i^p))\frac{\partial f(X_i^a) - \partial f(X_i^p)}{\partial \Omega} - 2\beta(f(X_i^a) - f(X_i^p))\frac{\partial f(X_i^a) - \partial f(X_i^p)}{\partial \Omega}$$

It is clear that the gradient of each triplet can be easily calculated given the values of $f(X_i^a)$, $f(X_i^p)$, $f(X_i^n)$ and $$\frac{\partial f(X_i^a)}{\partial \Omega}, \frac{\partial f(X_i^p)}{\partial \Omega}, \frac{\partial f(X_i^n)}{\partial \Omega},$$

which can be obtained by separately running the forward and backward propagation for each image in the triplet units.

In another embodiment, a pairwise term can also be used to reduce overfitting problems by keeping the diversity of the training samples. Given an anchor sample, this method randomly chooses the matched or mismatched candidates from a gallery set to minimize the positive distances and maximize the negative distances. For example, the pairwise term and the triplet term can be formulated as follows:

$$L = L_P(X, W, b) + \alpha L_T(X, W, b)$$

where $L_P(\bullet)$ is the pairwise term, $L_T(\bullet)$ denotes the triplet term, and $\alpha$ is a constant weight parameter. Given an anchor sample, the pairwise term randomly selects the positive and negative candidates to avoid the overfitting of the deep CNN, while the triplet term specifically chooses the marginal samples to boost the ranking performance.

Taking the pairwise samples as input, a large margin between the positive pairs and negative pairs is assumed. Specifically, the pairwise term aims to penalize the positive distances smaller than a preset down-margin and the negative distances larger than a preset upper-margin. The hinge loss of the pairwise term can be formulated as follows:

$$L_P = \sum_{i,j=1}^{N} \max\left\{ C_P - \frac{1}{M} \sum_{r=1}^{M} G_{i,j}^a (M_P - \|x_A^{i,a} - x_B^{j,r}\|_2^2), 0 \right\}$$

where the two parameters $M_p > C_p$ are used to define the down-margin and upper-margin, particularly $M_p - C_p$ represents the down-margin, and $M_p + C_p$ denotes the up-margin. Given the $i^{th}$ and $j^{th}$ identities, the indicator matrix $G_{i,j}^a$ refers to the correspondence of the $r^{th}$ image in camera B to the anchor image in camera A, which is defined as follows:

$$G_{i,j}^a = \begin{cases} +1, & \text{if } i = j, \text{ and } r \leq M; \\ -1, & \text{if } i \neq j, \text{ and } r \leq M. \end{cases}$$

where $G_{i,j}^a$ is in size of N×M, and $G_{i,j}^a = 1$ means that the $r^{th}$ image of the $j^{th}$ identity is referred to the same person to that of the anchor image of the $i^{th}$ identity, while $G_{i,j}^a = -1$ means the opposite.

Different from the pairwise term, the triplet term aims to improve the ranking performance by maximizing the relative distance between anchor to positive set and anchor to negative set. A point-to-set distance is defined as the average distance between anchor and marginal set samples, in which the anchor-to-negative set distance should also satisfy $\|x_A^{i,a} - x_B^{j,r}\|_2^2 < \|x_A^{i,a} - x_B^{k,s}\|_2^2$, where i=j, i≠k and r, s≤M. The relative point to set distance in the symmetric triplet formulation, and the hinge loss of the triplet term can be defined as follows:

$$L_T = \sum_{i,j,k=1}^{N} \max\left\{ M_t - \frac{1}{M} \sum_{r,s=1}^{M} T(x_A^{i,a}, x_A^{j,r}, x_A^{k,s}), 0 \right\}$$

where $M_t$ denotes the relative margin parameter, and $T(\bullet)$ represents the relative point to set distance which is defined as follows:

$$T = P_{i,j}^a \|x_A^{i,a} - x_B^{j,r}\|_2^2 - N_{i,k}^a [\mu \|x_A^{i,a} - x_B^{k,s}\|_2^2 + \nu \|x_B^{j,r} - x_B^{k,s}\|_2^2]$$

where $P_{i,j}^a$, $N_{i,k}^a$ denote the positive and negative indicator matrixes, and $\mu$, $\nu$ are two adaptive weight parameters. Given the triplet identity $\{i, j, k\}$, the indicator matrixes $P_{i,j}^a$ and $N_{i,k}^a$ represent the matched and unmatched candidates of the $r^{th}$ and $s^{th}$ image in camera B to the anchor image in camera A, respectively. They are defined as follows:

$$P_{i,j}^a = \begin{cases} 1, & \text{if } i = j, \text{ and } r = \tau_p(a); \\ 0, & \text{else}. \end{cases}$$

$$N_{i,k}^a = \begin{cases} 1, & \text{if } i \neq k, \text{ and } s = \tau_n(a); \\ 0, & \text{else}. \end{cases}$$

where $P_{i,j}^a$ and $N_{i,k}^a$ are both in size of N×M, and $P_{i,j}^a = 1$ means that the $r^{th}$ image of the $j^{th}$ identity is referred to the same person to that of the anchor image of the $j^{th}$ identity, $N_{i,k}^a = 1$ means that the $s^{th}$ image of the $k^{th}$ identity is referred to the different person to that of the anchor image of the $i^{th}$ identity, while $P_{i,j}^a = 0$ and $N_{i,k}^a = 0$ mean the opposite. The positive and negative marginal samples are represented by $\tau_p(a)$ and $\tau_n(a)$, and both of them can be collected by using the nearest neighbor search algorithm.

In another described embodiment, in order to reduce side effects from noise samples, a self-paced method to adaptively emphasize the high-confidence fidelity samples and suppress the low-confidence noisy samples can be used. Such a system can automatically screen the outliers with zero weights to eliminate the negative influence of such harmless samples. A symmetry regularization term is used to revise the asymmetric gradient back-propagation of relative similarity comparison metric, so as to jointly minimize the intra-class distance and maximize the inter-class distance in each triplet unit.

Figure 5:
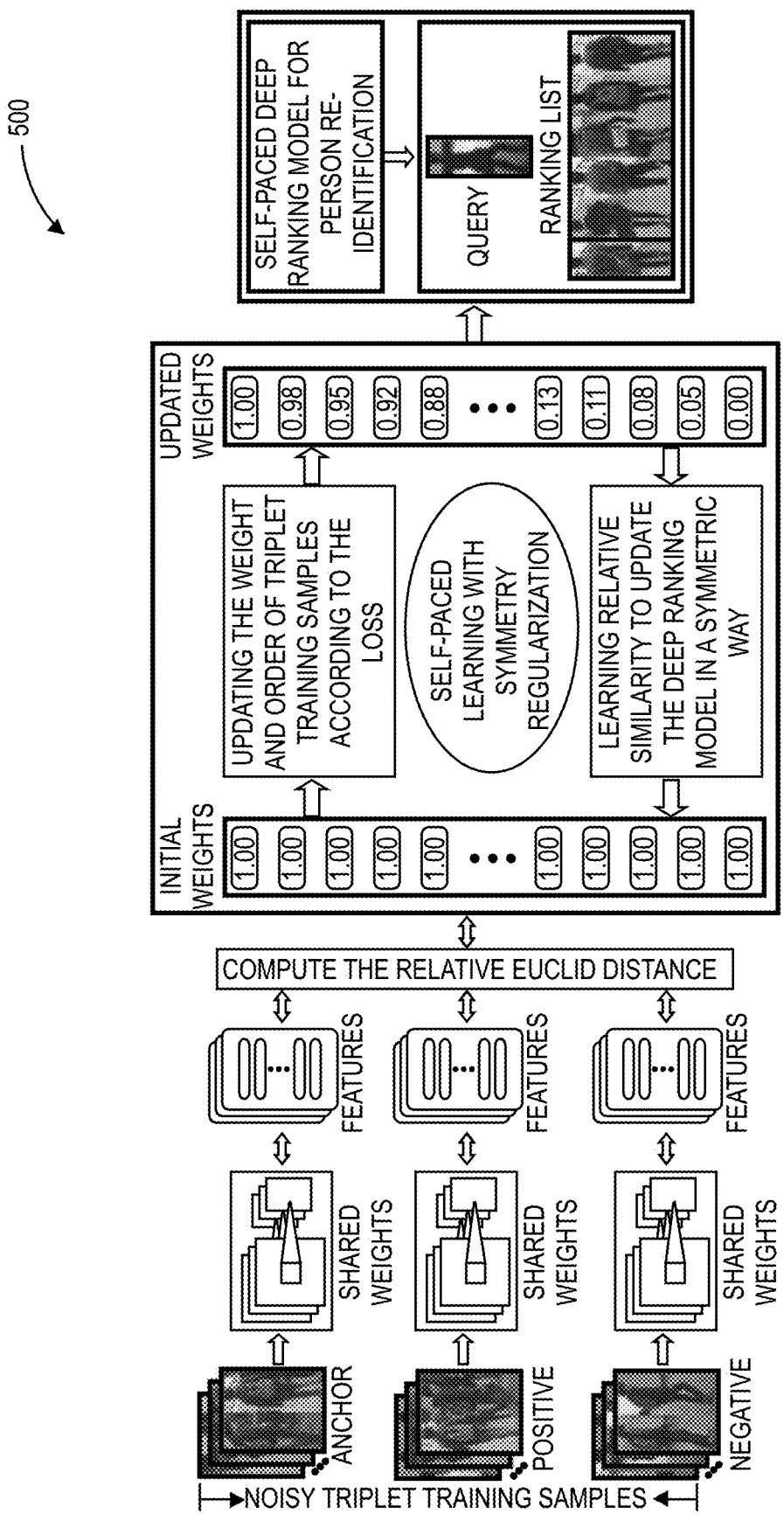
FIG. 5 illustrates a system including self-paced learning with symmetry regularization.

Given a set of triplet units $X = \{x_i^a, x_i^p, x_i^n\}_{i=1}^N$, where $x_i^a$ and $x_i^p$ are the positive pairs and $x_i^a$ and $x_i^n$ represent the negative pairs, a self-paced ranking can be developed as follows:

$$L = \sum_{i=1}^{N} \mu_i \mathcal{R}(x_i^a, x_i^p, x_i^n) + \mathcal{G}(\mu, \gamma, \vartheta) + \zeta \mathcal{S}(x_i^a, x_i^p, x_i^n)$$

where $\mu = [\mu_1, \ldots, \mu_N]^T$ are the weights of all samples, $\lambda$, $\vartheta$ are the model age parameters, $\zeta$ is the weight parameter. Use of this method allows jointly pulling the positive pairs and pushing the negative pairs in each triplet unit. In effect, the first term maximizes the relative distances between the positive pairs and negative pairs, the second term updates the sample weights in a self-paced manner, and the third term revises the gradient back-propagation in a symmetric way. This is generally illustrated in FIG. 5, with self-paced deep ranking model 500 developed by relative similarity comparison.

Relative similarity comparison can be formulated as follows:

$$\mathcal{R} = \max\{\mathcal{M} + \|f(x_i^a) - f(x_i^p)\|_2^2 - \|f(x_i^a) - f(x_i^n)\|_2^2, 0\}$$

where $\mathcal{M}$ is the margin between positive pairs and negative pairs in the feature space, and the $f(\bullet)$ is the learned feature mapping function. As a result, the relative distance between positive pairs and negative pairs are maximized, which improves the ability to distinguish different individuals. This metric is not generally applied directly, since the presence of equivalent training samples and asymmetric gradient back-propagation can significantly weaken the generalization ability of the learned deep ranking model. Instead, a self-paced regularizer term can be used.

Figure 6:
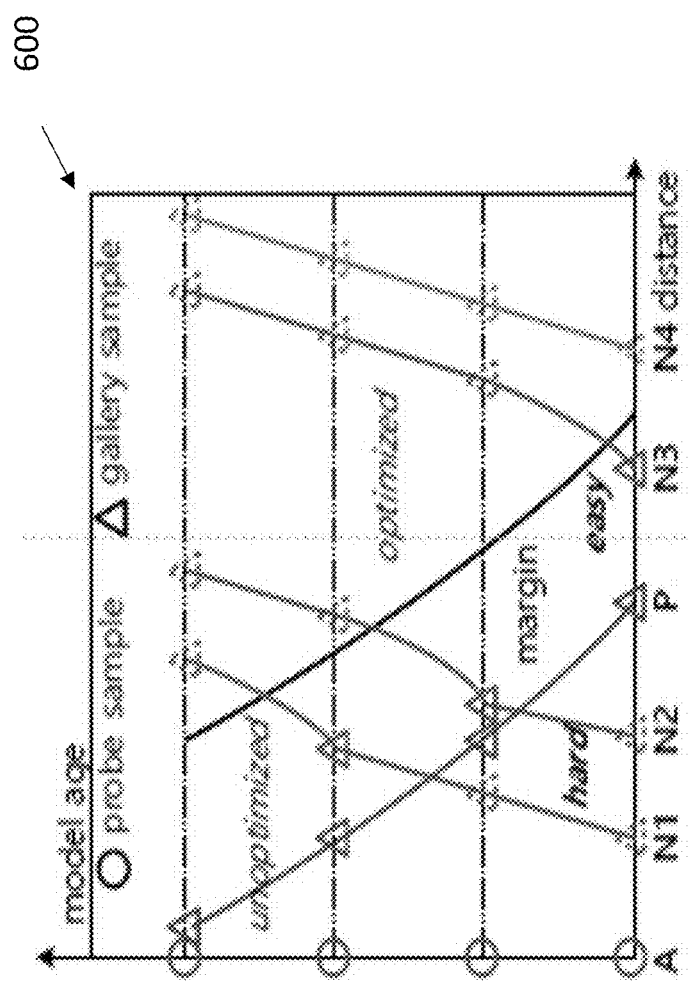
FIG. 6 illustrates how a self-paced regularizer term adaptively updates the weights of samples for hard and easy samples according to both the loss and model age.

The self-paced regularizer term adaptively updates the weights of samples according to both the loss and model age. As shown in graph 600 of FIG. 6, easy samples will contribute more than the hard samples when the model is young, and all the samples will be involved equally when the model is mature. A soft novel polynomial regularizer term can be use, which is formulated as follows:

$$\mathcal{G} = \lambda \left( \frac{1}{t} \|\mu\|_2^t - \frac{1}{t} \sum_{i=1}^N u_i \right)$$

where $\lambda > 0$ is the model age, $1 > \vartheta > 0$ is the mature age, and t is the polynomial order. In contrast to regularizers base on hard weighting or soft weighting, the described method penalizes the loss according to the value of polynomial order. As a result, the weighting scheme deduced by our regularizer term can approach all of them.

A symmetry regularizer term can be used to revise the asymmetric gradient back-propagation deduced by the relative similarity comparison metric. As a result, the intra-class distance can be minimized and the inter-class distance can be maximized simultaneously in each triplet unit. The deviation between two negative distances is penalized to keep the symmetric gradient back-propagation, which is formulated as follows:

$$\mathcal{S} = \frac{1}{\gamma} \log(1 + \exp(\gamma \mathcal{Z}))$$

where $\mathcal{Z} = |\|f(x_i^a) - f(x_i^p)\|_2^2 - \|f(x_i^a) - f(x_i^n)\|_2^2|$ is the deviation measured in the Euclid distance, and γ is the sharpness parameter. Using techniques such as described with respect to FIG. 3, $F_1$ and $F_3$ can jointly revise the back-propagation of negative sample and positive sample in each triplet unit. Strength and direction can also be adaptively tuned according to the deviation.

A gradient back-propagation method can be used to optimize the parameters of deep convolutional neural networks (CNN) and weights of training samples. For simplicity, consider the deep parameters as a whole and define $\Omega^{(k)} = [W^{(k)}, b^{(k)}]$, and $\Omega = \{\Omega^{(1)}, \ldots, \Omega^{(K)}\}$.

In order to employ the back-propagation algorithm to optimize the deep parameters, the partial derivative of the loss function is computed as follows:

$$\frac{\partial L}{\partial \Omega} = \sum_{i=1}^N \mu_i r(x_i^a, x_i^p, x_i^n) + \zeta s(x_i^a, x_i^p, x_i^n)$$

where the two terms represent gradient of the relative similarity term and symmetry regularizer term.

Defining $\mathcal{T} = \mathcal{M} + \|f(x_i^a) - f(x_i^p)\|_2^2 - \|f(x_i^a) - f(x_i^n)\|_2^2$, therefore the gradient of relative similarity term can be formulated as follows:

$$\frac{\partial L}{\partial \Omega} = \sum_{i=1}^N \mu_i r(x_i^a, x_i^p, x_i^n) + \zeta s(x_i^a, x_i^p, x_i^n)$$

where $$\frac{\partial \mathcal{R}}{\partial \Omega}$$

is formulated as follows:

$$\frac{\partial \mathcal{R}}{\partial \Omega} = 2(f(x_i^a) - f(x_i^p))' \cdot \frac{\partial f(x_i^a) - \partial f(x_i^p)}{\partial \Omega} - 2(f(x_i^a) - f(x_i^n))' \cdot \frac{\partial f(x_i^a) - \partial f(x_i^n)}{\partial \Omega} - 2(f(x_i^p) - f(x_i^n))' \cdot \frac{\partial f(x_i^p) - \partial f(x_i^n)}{\partial \Omega}$$

By defining $\mathcal{D} = \|f(x_i^a) - f(x_i^p)\|_2^2 - \|f(x_i^a) - f(x_i^n)\|_2^2$, then the gradient of symmetry regularizer term can be formulated as follows:

$$s = \eta \text{sign}(\mathcal{D}) \cdot \frac{\partial \mathcal{D}(x_i^a, x_i^p, x_i^n)}{\partial \Omega}$$

where $\eta = \exp(\gamma \mathcal{Z})/(1 + \exp(\gamma \mathcal{Z}))$ and $\text{sign}(\mathcal{D})$ denote the strength and direction in the symmetric back-propagation, and $$\frac{\partial \mathcal{D}}{\partial \Omega}$$

is formulated as follows:

$$\frac{\partial \mathcal{D}}{\partial \Omega} = 2(f(x_i^a) - f(x_i^n))' \cdot \frac{\partial f(x_i^a) - \partial f(x_i^n)}{\partial \Omega} - 2(f(x_i^p) - f(x_i^n))' \cdot \frac{\partial f(x_i^p) - \partial f(x_i^n)}{\partial \Omega}$$

Figure 7:
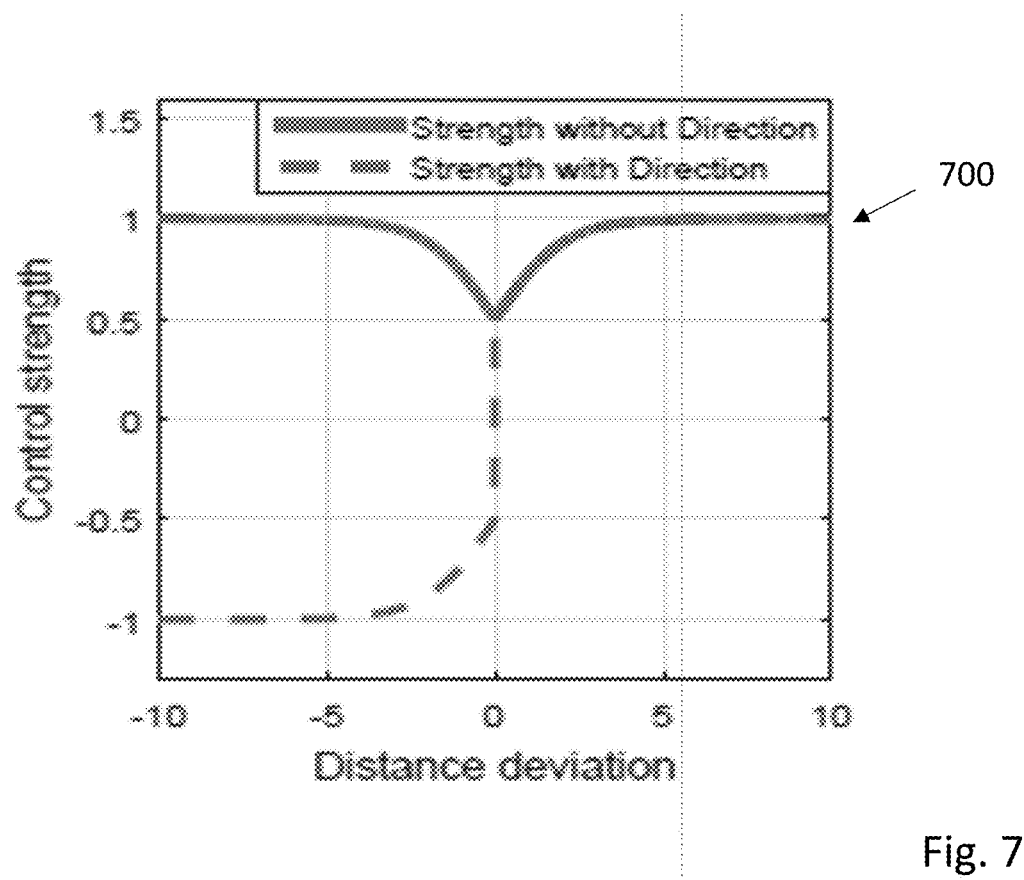
FIG. 7 is a graph illustrating how deduced strength and direction in controlling the gradient back-propagation can be adaptively updated according to the distance derivation.

As shown in graph 700 of FIG. 7, the deduced strength and direction in controlling the gradient back-propagation can be adaptively updated according to the distance derivation, which promotes the symmetry back-propagation.

In order to update the weights of samples in each iteration, a closed form solution of the self-paced learning model can be used under the described regularizer term. Because the soft polynomial regularizer is convex in [0,1], it is easy to derive the optimal solution to $\min_{\mu \in [0,1]} \Sigma_{i=1}^N \mu_i \mathcal{R} + \mathcal{G}(\mu, \gamma, \vartheta)$ as follows:

$$\mu_i^* = \begin{cases} 1, & \text{if } \mathcal{R} < \lambda \left( \frac{1}{\vartheta} - 1 \right) \\ 0, & \text{if } \mathcal{R} > \frac{\lambda}{\vartheta} \\ \left( \frac{1}{\vartheta} - \frac{\mathcal{R}}{\lambda} \right) 1/(t-1), & \text{otherwise} \end{cases}$$

Figure 8:
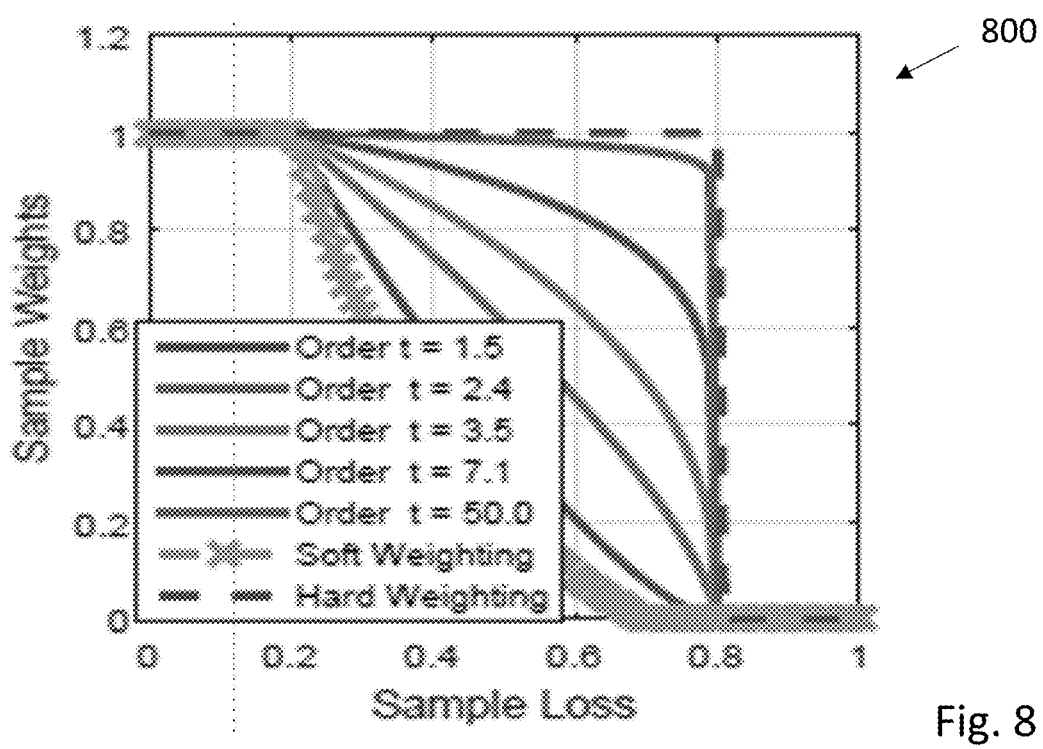
FIG. 8 illustrates hard and soft weighting schemes in which tuning the polynomial order can be used for adjustment.

The comparison with hard and soft weighting schemes are shown in graph 800 of FIG. 8, in which tuning the polynomial order can be used to adjust the method. If the loss is smaller than a threshold $\lambda/\vartheta$, it will be treated as an easy sample and assigned a positive weight; If the loss is further smaller $\lambda(1/\vartheta-1)$, the sample is treated as a faithful sample weighted by 1. Therefore, the easy-sample-first property and soft weighting strategy are all inherited.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A visual recognition system, comprising:
a global sub-network including a convolutional layer and a first max pooling layer;
a local sub-network connected to receive data from the global sub-network, and including at least two convolutional layers, each connected to a max pooling layer;
a fusion network connected to receive data from the local sub-network, and including a plurality of fully connected layers that respectively determine local feature maps derived from images; and
a loss layer connected to receive data from the fusion network and set filter parameters, the loss layer implementing a symmetric triplet loss function configured to: (a) both maximize inter-class distances and minimize intra-class distances by fine tuning directions of gradient back-propagation and (b) train the visual recognition system to learn filter weights and biases that minimize ranking error.

2. The visual recognition system of claim 1, wherein the symmetric triplet loss function is further configured to improve ranking accuracy by jointly keeping similarity of positive image pairs and dissimilarity of negative image pairs.

3. The visual recognition system of claim 1, wherein fine tuning directions of gradient back-propagation comprise optimizing parameters for a similarity metric that includes a pairwise term and a triplet term.

4. The visual recognition system of claim 1, wherein the symmetric triplet loss function is implemented using $$X_i^{(m)} = \Psi(W^{(m)} * X_i^{(m-1)} + b^{(m)}),\ i=1, 2, \ldots, N;\ m=1, 2, \ldots, M;\ X_i^{(0)} = X_i.$$

5. The visual recognition system of claim 1, wherein the fusion layer further comprises rectified linear units (ReLU) connected between fully connected layers.

6. The visual recognition system of claim 1, wherein the dimension of the fully connected layers in the fusion layer is at least 100.

7. The visual recognition system of claim 1, wherein the dimension of the fully concatenated connected layers representing image featured in the fusion layer is at least 800.

8. The visual recognition system of claim 1, wherein the at least two convolutional layers of the local sub-network includes a plurality of filters.

9. The visual recognition system of claim 1, wherein the global sub-network further comprises rectified linear units (ReLU).

10. A visual recognition image processing method comprising:
providing a global sub-network including a convolutional layer and a first max pooling layer to extract features from images and form feature maps;
passing the feature maps to a local sub-network connected to the global sub-network to discriminately learn features;
generating final feature representations using a fusion network connected to receive data from the local sub-network; and
using a loss layer connected to receive data from the fusion network and set filter parameters, the loss layer implementing a symmetric triplet loss function configured to: (a) both maximize inter-class distances and minimize intra-class distances by fine tuning directions of gradient back-propagation and (b) train the visual recognition system to learn filter weights and biases that minimize ranking error.

11. The visual recognition system of claim 1, wherein the symmetric triplet loss function comprises a multi-layer model recursive function that integrates the filter weights, the biases, a convolution operation, an element-wise non-linear activation function, and the feature maps.

12. The visual recognition image processing method of claim 10, wherein the symmetric triplet loss function is further configured to improve ranking accuracy by jointly keeping similarity of positive image pairs and dissimilarity of negative image pairs.

13. The visual recognition image processing method of claim 10, wherein fine tuning directions of gradient back-propagation comprise optimizing parameters for a similarity metric that includes a pairwise term and a triplet term.

14. The visual recognition image processing method of claim 10, wherein the symmetric triplet loss function comprises a multi-layer model recursive function that integrates the filter weights, the biases, a convolution operation, an element-wise non-linear activation function, and the feature maps.

15. The visual recognition image processing method of claim 10, wherein the symmetric triplet loss function is implemented using $$X_i^{(m)} = \Psi(W^{(m)} * X_i^{(m-1)} + b^{(m)}),\ i=1, 2, \ldots, N;\ m=1, 2, \ldots, M;\ X_i^{(0)} = X_i.$$

16. A system comprising:
a processor; and
system memory coupled to the processor and storing instructions configured to cause the processor to:
provide a global sub-network including a convolutional layer and a first max pooling layer to extract features from images and form feature maps;
pass the feature maps to a local sub-network connected to the global sub-network to discriminately learn features;
generate final feature representations using a fusion network connected to receive data from the local sub-network; and
use a loss layer connected to receive data from the fusion network and set filter parameters, the symmetric loss function implementing a symmetric triplet loss function configured to: (a) both maximize inter-class distances and minimize intra-class distances by fine tuning directions of gradient back-propagation and (b) train the visual recognition system to learn filter weights and biases that minimize ranking error.

17. The system of claim 16, wherein the symmetric triplet loss function is further configured to improve ranking accuracy by jointly keeping similarity of positive image pairs and dissimilarity of negative image pairs.

18. The system of claim 16, wherein fine tuning directions of gradient back-propagation comprise optimizing parameters for a similarity metric that includes a pairwise term and a triplet term.

19. The system of claim 16, wherein the symmetric triplet loss function comprises a multi-layer model recursive function that integrates the filter weights, the biases, a convolution operation, an element-wise non-linear activation function, and the feature maps.

20. The system of claim 16, wherein the symmetric triplet loss function is implemented using $X_i^{(m)} = \Psi(W^{(m)} * X_i^{(m-1)} + b^{(m)})$, $i=1, 2, \ldots, N$; $m=1, 2, \ldots, M$; $X_i^{(0)} = X_i$.

\* \* \* \* \*